United States Patent
Liang et al.

(10) Patent No.: US 10,211,689 B2
(45) Date of Patent: Feb. 19, 2019

(54) ELECTRIC MACHINE ROTOR

(71) Applicant: Ford Global Technologies, LLC, Dearborn, MI (US)

(72) Inventors: Feng Liang, Troy, MI (US); Benedikt Groschup, Bavaria (DE); Franco Leonardi, Dearborn Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 276 days.

(21) Appl. No.: 15/064,643

(22) Filed: Mar. 9, 2016

(65) Prior Publication Data

US 2017/0264152 A1   Sep. 14, 2017

(51) Int. Cl.
   *H02K 1/30*   (2006.01)
   *H02K 1/27*   (2006.01)

(52) U.S. Cl.
   CPC ......... *H02K 1/2706* (2013.01); *H02K 1/2766* (2013.01); *H02K 1/30* (2013.01)

(58) Field of Classification Search
   CPC ....... H02K 1/30; H02K 1/2706; H02K 1/2766
   USPC .................................... 310/156.01
   See application file for complete search history.

(56) References Cited

U.S. PATENT DOCUMENTS

| | | | |
|---|---|---|---|
| 4,585,967 A | 4/1986 | Mayer et al. | |
| 4,822,330 A | 4/1989 | Penhasi | |
| 4,987,330 A | 1/1991 | Murphy et al. | |
| 6,707,206 B2 | 3/2004 | Chang | |
| 6,891,297 B2 | 5/2005 | Shimada et al. | |
| 6,940,199 B2* | 9/2005 | Imamura | H02K 1/278 310/156.01 |
| 7,436,096 B2 | 10/2008 | Guven et al. | |
| 7,763,336 B2 | 7/2010 | Clarke et al. | |
| 7,902,711 B2 | 3/2011 | Blissenbach et al. | |
| 7,948,133 B2 | 5/2011 | Fu | |
| 8,729,767 B2* | 5/2014 | Feuerrohr | H02K 1/2773 310/216.069 |
| 8,896,176 B2 | 11/2014 | Ryu et al. | |
| 8,957,560 B2 | 2/2015 | Uchiyama et al. | |
| 9,035,522 B2* | 5/2015 | Liang | H02K 1/2766 310/156.53 |
| 9,385,567 B2* | 7/2016 | Nagahiro | H02K 1/28 |
| 2012/0074805 A1* | 3/2012 | Takizawa | H02K 1/276 310/156.01 |

(Continued)

OTHER PUBLICATIONS

Office Action issued in U.S. Appl. No. 15/064,645, dated Apr. 11, 2018, 9 pages.

(Continued)

*Primary Examiner* — Forrest M Phillips
(74) *Attorney, Agent, or Firm* — Brooks Kushman P.C.

(57) ABSTRACT

An electric machine rotor includes a lamination configured to rotate about a central axis and a plurality of pairs of permanent magnets. Each pair of permanent magnets is arranged in a V-shaped pattern and affixed within the lamination to create a magnetic field for rotation of the lamination. The lamination also includes an outer periphery spanning circumferentially outside of the permanent magnets, wherein a mass-reduction cutout extends through the lamination nested within in a V-shape defined by the permanent magnets adjacent to an outer surface of the rotor. The lamination further includes a stress-reduction slot that extends through the outer periphery of the rotor.

15 Claims, 4 Drawing Sheets

(56) References Cited

U.S. PATENT DOCUMENTS

| | | |
|---|---|---|
| 2012/0093447 A1 | 4/2012 | Hibi et al. |
| 2012/0248915 A1* | 10/2012 | Kagami ............... H02K 1/2766 |
| | | 310/156.01 |
| 2013/0043761 A1 | 2/2013 | Kaimori et al. |
| 2013/0234557 A1 | 9/2013 | Kobayashi et al. |
| 2014/0210293 A1* | 7/2014 | Kagami ............... H02K 1/2766 |
| | | 310/156.01 |
| 2014/0361656 A1* | 12/2014 | Legranger ............ H02K 1/2773 |
| | | 310/156.38 |
| 2015/0236555 A1 | 8/2015 | Takeda et al. |
| 2016/0105059 A1* | 4/2016 | El Baraka ................ H02K 1/02 |
| | | 310/156.01 |

OTHER PUBLICATIONS

Final Rejection for copending U.S. Appl. No. 15/064,645, dated Sep. 11, 2018, 8 Pages.

* cited by examiner

ELECTRIC MACHINE ROTOR

TECHNICAL FIELD

The present disclosure relates to a permanent magnet electric machine rotor.

BACKGROUND

Electric machines typically employ a rotor and a stator to produce torque. Electric current flows through windings of the stator to produce a magnetic field. The magnetic field generated by the stator may cooperate with permanent magnets affixed to the rotor to generate torque.

SUMMARY

An electric machine may include a rotor defining a plurality of cavities circumferentially distributed about an outer periphery thereof and having an outer surface defining a plurality of slots each extending into one of the cavities to reduce stress concentration in lamination material between the cavities and outer surface. The slots may be sized to form a gap of about 0.4 mm through the outer periphery of the rotor. The mass-reduction cutout is generally triangular shaped and the stress-reduction slot extends from an outer base portion of the triangular shaped mass-reduction cutout. The slot may be oriented to extend orthogonally from the central axis of the rotor. The slot may be oriented obliquely relative to the central axis of rotation of the rotor.

DETAILED DESCRIPTION

Figure 1:
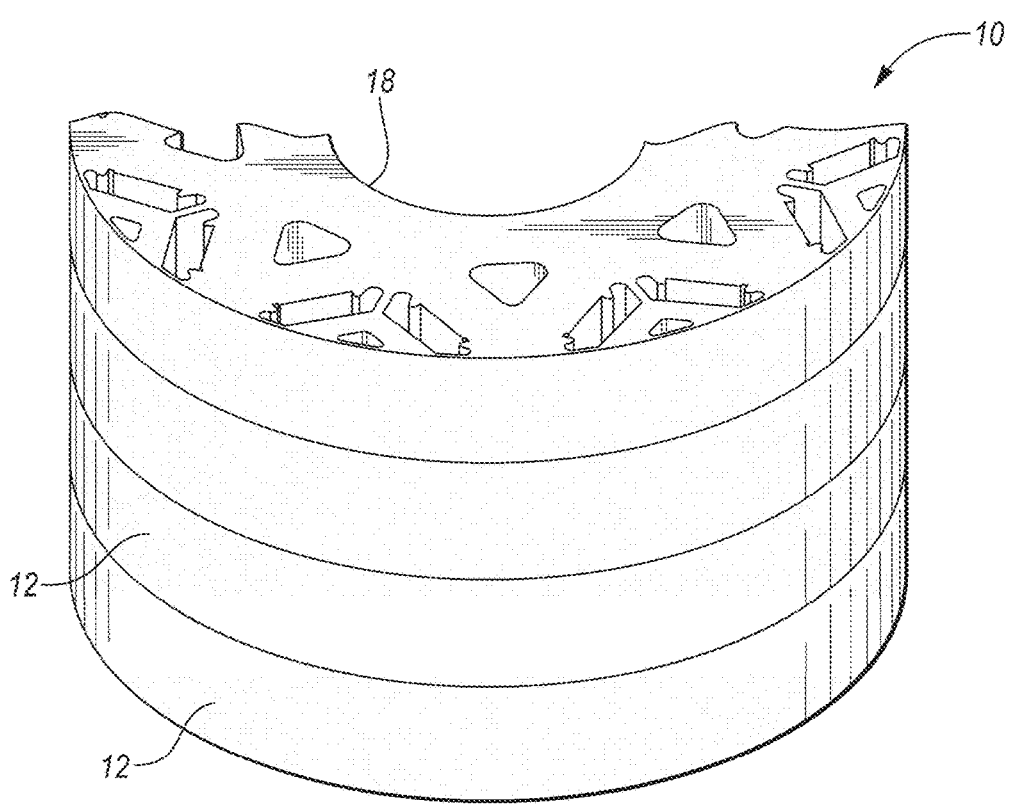
FIG. 1 is a perspective view of a stack of laminations of a rotor of an electric machine.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A rotor of an electric machine may have a continuous periphery to maintain a constant airgap between the rotor and stator. The airgap permeance may have a direct effect on the output characteristics of the electric machine. Irregularities in the outer perimeter of the rotor are generally avoided to limit any detrimental effects on the machine dynamics. Slots on the outer periphery of the rotor may reduce particularly unwanted stresses imparted on the rotor during use.

In general, rotor laminations may have pockets or cavities arranged around the periphery of the rotor to house permanent magnets. The permanent magnets may be situated to interact with the magnetic field generated by the stator windings. These pockets or cavities may include flux-shaping areas to minimize undesired flux leakage between magnets. These cavities having flux-shaping areas may cause undesired stresses to arise in an outer band of the rotor near the cavities. A slot located near mass-reduction cutouts may, unexpectedly, reduce the undesirable stresses near the cavities. Meaning, a slot dislocated from cavities may have an impact on the stresses located in other areas of the outer band. The position of the permanent magnet cavities may compel a particular location of the mass-reduction cutouts. V-shaped permanent magnet cavities may similarly warrant triangular-shaped mass-reduction cutouts. Each slot on the rotors outer perimeter may be located near the mass-reduction cutouts. The slot may be right-angled or slanted, and the slot may be located in the center of each mass-reduction cutout or elsewhere on the periphery to provide similar unexpected results.

An electric machine may include a rotor defining a plurality of cavities circumferentially distributed about an outer periphery thereof and having an outer surface defining a plurality of slots each extending into one of the cavities to reduce stress concentration in lamination material between the cavities and outer surface. Each lamination of the rotor may define a mass-reduction cutout between a pair of permanent magnets. One of the slots extends from the mass-reduction cutout through the outer surface of one of the laminations. Each pair of the permanent magnets is arranged in a V-shaped pattern. A triangular mass-reduction cutout may extend through each lamination nested within the V-shaped pattern created by the permanent magnets. The mass-reduction cutout may be other shapes (e.g., ovoid, rectangular).

One of the slots may be sized to form a gap of about 0.4 mm through the outer surface of one of the laminations. Each slot may vary in size to alter the stress distribution and airgap permeance. The slots may be oriented radially outward or angled. Slot width may be minimized to limit impacts on airgap permeance, and a large slot width may detrimentally affect the torque production of the electric machine.

A rotor lamination may contain respective pairs of permanent magnets circumferentially distributed about an outer periphery of the lamination to cause rotation of the rotor when subjected to an external magnetic field. The lamination may define a plurality of cavities circumferentially distributed about the outer periphery. Each of the cavities may be disposed between one of the pairs, and including a plurality of slots each extending from the outer periphery into one of the cavities.

Referring to FIG. 1, a rotor 10 of an electric machine is depicted. The rotor 10 may include a stack of laminations 12. Each of the laminations includes a plurality of slots each configured to hold a permanent magnet. An electric machine includes a stator circumscribing the rotor 10. The stator also includes a number of windings to generate an electromagnetic field in response to current flow. The electromagnetic field repels the permanent magnets causing rotation of the rotor 10 when the electric machine is energized.

Figure 2:
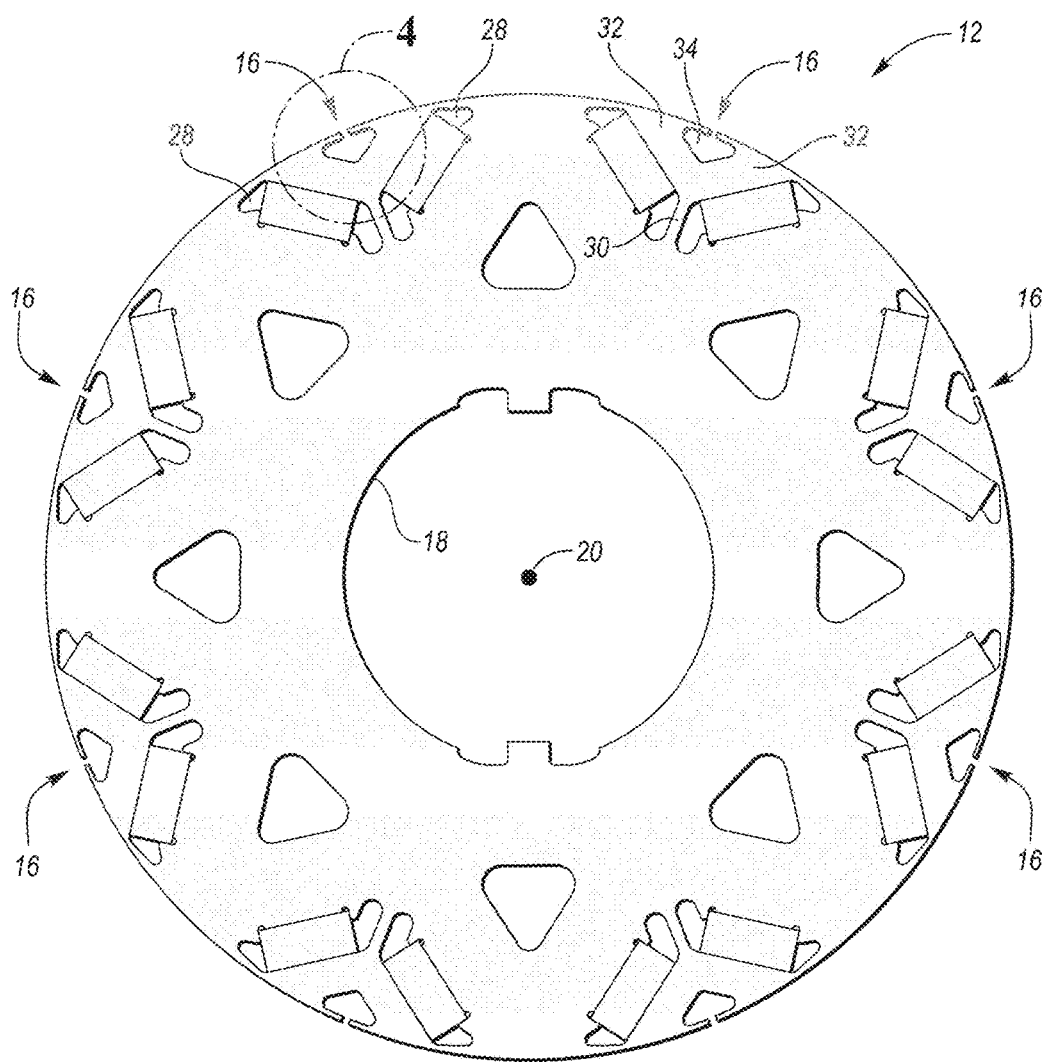
FIG. 2 is a top view of a lamination.

Referring to FIG. 2, a top view of a lamination 12 is depicted. The lamination 12 includes a plurality of pairs of permanent magnets generating magnetic poles 16 spaced around a perimeter of the rotor. A center opening or hole 18 is provided on an inner diameter, surface, or edge of the rotor to engage an output shaft.

A number of bridges connect the material surrounding the permanent magnet pockets 28. A center bridge 30 extends radially between the pockets 28. Top side bridges 32 extend circumferentially outside of the pockets 28. The combination of each center bridge with the pair of outer top side bridges holds the part of the lamination beyond the bridges and the magnets under centrifugal load. Mechanically, the bridges allow the rotor to reliably withstand centrifugal loads caused by the rotor being electromagnetically driven during operation of the electric machine. However, the bridges also lead to magnetic flux leakage, which reduces the output torque and efficiency of the electric machine. Thus, thin bridges are electromagnetically desirable to enable high torque output and motor efficiency. The balance between strength and performance leads to a fundamental trade-off between mechanical and electromagnetic design.

Additionally, the V-shaped orientation of the pockets 28 holding permanent magnet pairs 16 define a solid mass nested in the center of the V portion. Mass-reduction cavities 34, or holes, are provided in a center portion of the solid mass. The mass-reduction cutout is adjacent to an outer surface of the rotor and creates thin material portion at the outer top side bridge 32 between the permanent magnets. Larger cavities 34 reduce more of the mass of the rotor lamination which needs to be held by the bridges.

Figure 3:
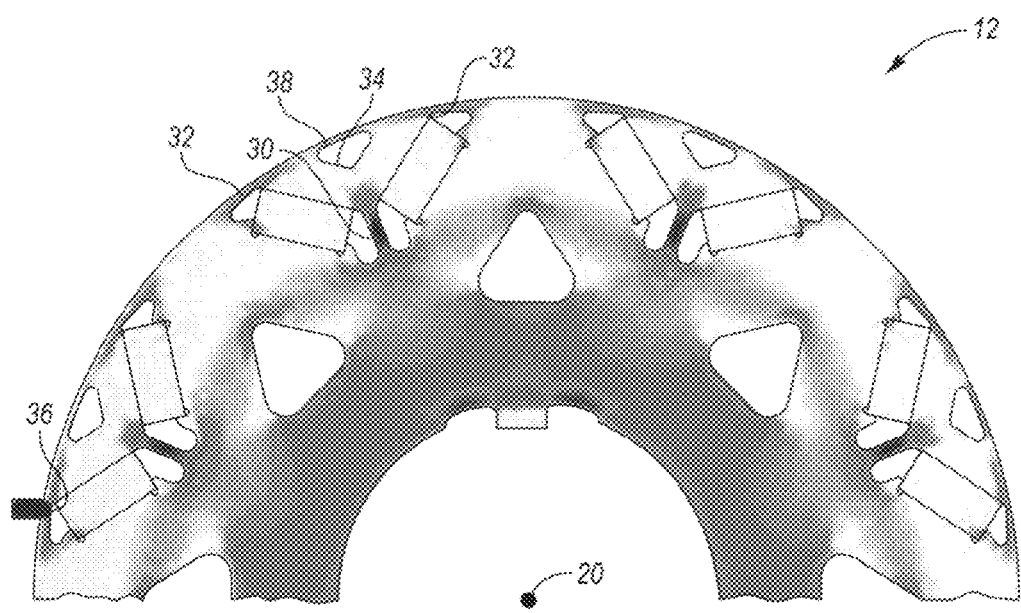
FIG. 3 is a contour plot of von Mises stress distribution of a baseline lamination.

FIG. 3 is a contour plot of von Mises stress for a portion of the rotor lamination 12 under load during operation of the electric machine. The stress distribution of FIG. 3 corresponds to a baseline rotor lamination without additional stress-reduction countermeasures. Stress concentrations are generated at various locations of the lamination 12. Specifically, many of the thin material bridges experience high stress due to the rotation of the rotor and the electromagnetic forces from the permanent magnets. The highest stress level in the lamination is frequently found to be near the outer top side bridges 32. In the example provided, the maximum stress encountered occurs at location 36 at an outer top side bridge 32. As can be seen in stress contour of FIG. 3, stress in the thin material portion 38 outside of the mass-reduction cutout 34 is significantly less than the stresses in the outer bridges 32 that are disposed on either side of the permanent magnets.

While providing smooth shapes around the perimeter of each holding portion for the permanent magnets may contribute to some degree of stress management, additional stress management techniques may allow for further optimization. As discussed above, the mass-reduction cutout 34 located near the outer circumference of each lamination 12 defines a thin material bridge between each pair of permanent magnets. According to an aspect of the present disclosure, stress-relieving slots are cut through the lamination at the outer portion of the mass-reduction cutouts.

Figure 4:
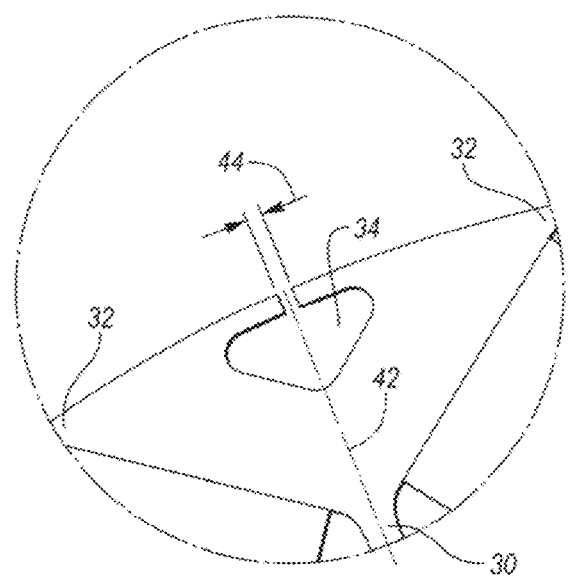
FIG. 4 is a top view of an excerpt of a lamination along View A of FIG. 2.

Referring to View A of FIG. 4, a stress-reduction slot 40 extends through the thin material portion 38. In the example provided, the mass-reduction cutout 34 is generally triangular shaped and extends through the lamination nested within the V-shaped pattern created by the pair of permanent magnets 16. The stress-reduction slot 40 extends from an outer base portion of the triangular shaped mass-reduction cutout 34. The stress-reduction slot 40 is oriented to extend radially outward from the axis of rotation 20 at the center of the rotor along a direction indicated by line 42. In alternative embodiments, the stress-reduction slot 40 may be oriented at an oblique angle relative to the axis of rotation 20 at the center of the rotor. The stress-reduction slots 40 cut through the outer holding band 26 reduce the stress in the outer top side bridges 32, which are particularly high stress areas for the laminations 12 the rotor 10. In at least one embodiment, each stress-reduction slot 40 is sized to form a gap 44 of about 0.4 mm through the outer holding band 26 of the rotor. The size of the slot impacts torque ripple, which may require the slot width to be reduced as much as possible provided that the same results are achieved.

Figure 5:
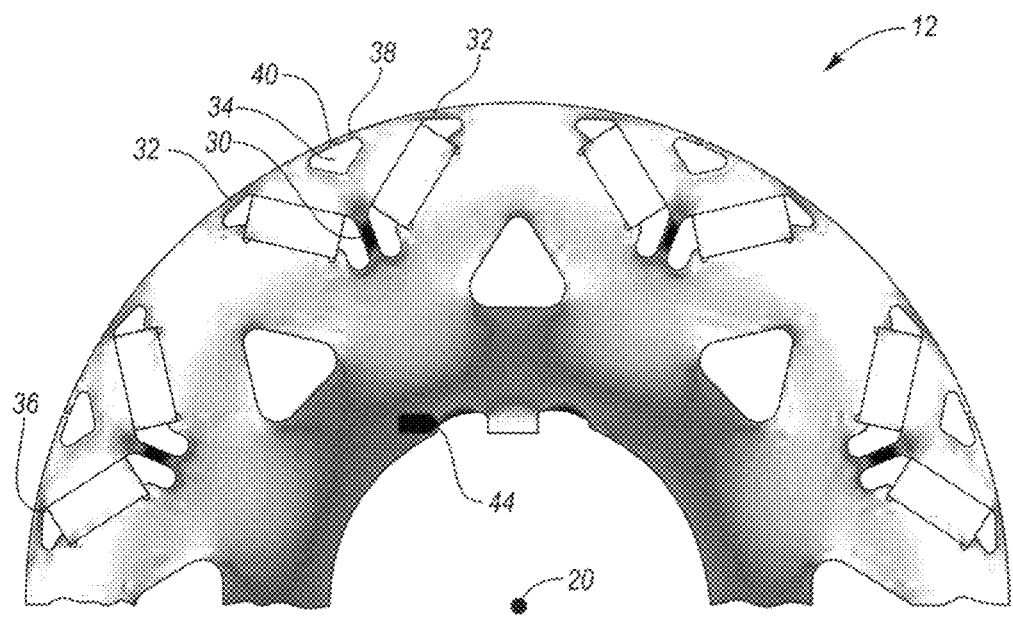
FIG. 5 is a contour plot of von Mises stress distribution of a lamination having a stress-reduction slot.

FIG. 5 discloses a stress distribution of the rotor. Unlike previous versions that did not have the slot, stresses are relieved by the stress-reduction slots 40. As implemented, the outer top side bridge 32 is no longer the location incurring maximum stress for the lamination. Further, the overall peak stress value is reduced, and the maximum stress location is migrated to location 44 near the center hole 18. It should be appreciated that the stress re-distribution caused by the stress-reduction slots 40 causes a stress increase at the center bridge 30. The increase in stress of the center bridge 30 may be deemed an appropriate trade-off in order to reduce overall max stress of the lamination.

Relative numerical results for the stress level in the center bridge and the outer top side bridges as well as the electromagnetic output variables under peak motor load for a slit with a width of 0.4 mm are shown below in Table 1.

TABLE 1

| Attribute | Change From Baseline Design With No Slots |
|---|---|
| Torque Ripple Change (peak-to-peak) | −32.8% |
| Average Torque Change | −0.3% |
| Von-Mises Stress Change (outer top side bridge) | −13.9% |
| Von-Mises Stress Change (center bridge) | +5.0% |

Also shown in Table 1 above, the addition of the stress-reduction slots 40 also influences the peak-to-peak torque of the electric machine under maximum load. In some embodiments, the stress reduction slots are also used to improve torque ripple behavior.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine comprising:
a rotor defining a plurality of cavities circumferentially distributed about an outer periphery thereof and having an outer surface defining a plurality of slots each extending into one of the cavities to reduce stress concentration in lamination material between the cavities and outer surface, the cavities defining a triangular mass-reduction cutout nested within a pair of permanent magnets arranged in a V-shaped pattern opening to the outer surface forming magnetic poles.

2. The rotor of claim 1, wherein one of the slots is sized to form a gap of about 0.4 mm through the outer surface of one of the laminations.

3. The rotor of claim 2, wherein one of the slots is oriented to extend orthogonally from a central axis of the rotor.

4. A rotor comprising:
a lamination containing respective pairs of permanent magnets circumferentially distributed about an outer periphery of the lamination, defining a plurality of cavities circumferentially distributed about the outer periphery such that each of the cavities is disposed between one of the pairs, and including a plurality of slots each extending from the outer periphery into one of the cavities.

5. The rotor of claim 4, wherein each of the pairs of permanent magnets is arranged in a V-shape pattern and wherein a triangular mass-reduction cutout extends through the lamination nested within the V-shaped pattern created by the permanent magnets.

6. The rotor of claim 4, wherein each lamination defines a mass-reduction cutout between a pair of permanent magnets and one of the plurality of slots extends from the mass-reduction cutout through an outer surface of the lamination.

7. The rotor of claim 6, wherein the one of the plurality of slots is sized to from a gap of about 0.4 mm through the outer surface of the lamination.

8. The rotor of claim 7, wherein the one of the plurality of slots is oriented to extend orthogonally from a central axis of the rotor.

9. The rotor of claim 6, wherein the one of the plurality of slots is oriented obliquely relative to a central axis of the rotor.

10. An electric machine comprising:
a stator having windings configured to generate an electromagnetic field; and
a rotor circumscribed by the stator having a plurality of pairs of permanent magnets arranged in a V-shape and opening to an outer perimeter thereof to facilitate driving of the rotor by the electromagnetic field, and defining a stress-reduction slot extending radially through the outer perimeter of the of the rotor between each of the pairs of permanent magnets.

11. The electric machine of claim 10, wherein each of the pairs of permanent magnets is oriented in a V-shaped pattern and a triangular mass-reduction cutout is nested in the V-shape.

12. The electric machine of claim 11, wherein each of the stress-reduction slots extend from a base of one of the triangular mass-reduction cutout through the outer perimeter of the rotor.

13. The electric machine of claim 10, wherein each of the stress-reduction slots is sized to form a gap of about 0.4 mm through the outer perimeter of a portion of the rotor.

14. The electric machine of claim 10, wherein each of the stress-reduction slots extend orthogonally from a central axis of rotation of the rotor.

15. The electric machine of claim 10, wherein each of the stress-reduction slots is oriented obliquely relative to a central axis of rotation of the rotor.

* * * * *